Figure 1:
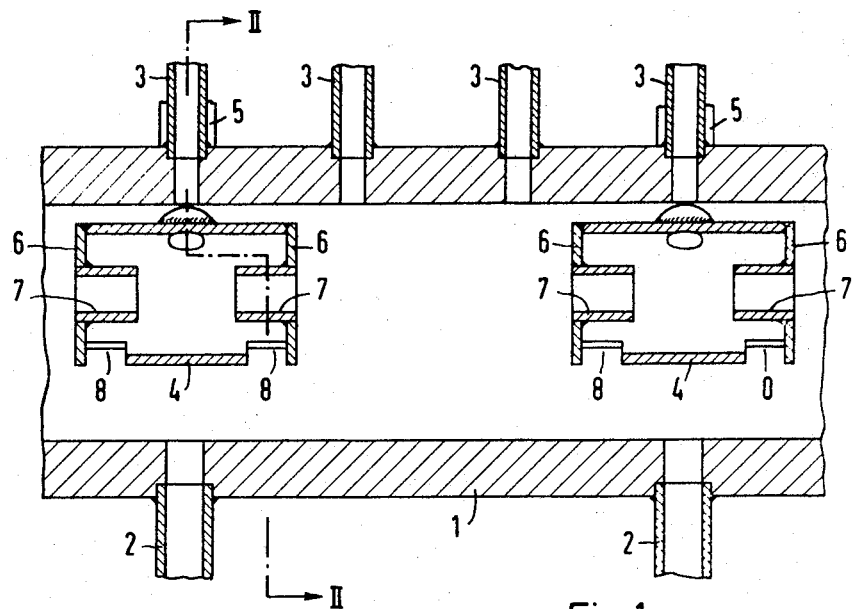

United States Patent

[11] 3,633,344

| [72] | Inventors | Gunter Blank<br>Erlangen;<br>Erwin Kramer, Furth, both of Germany |
|---|---|---|
| [21] | Appl. No. | 67,987 |
| [22] | Filed | Aug. 28, 1970 |
| [45] | Patented | Jan. 11, 1972 |
| [73] | Assignee | Siemens Aktiengesellschaft |
| [32] | Priority | Nov. 21, 1967 |
| [33] | | Germany |
| [31] | | P 15 76 879.3 |
| | | Continuation of application Ser. No. 774,981, Nov. 12, 1968, now abandoned. This application Aug. 28, 1970, Ser. No. 67,987 |

[54] APPARATUS FOR CENTRIFUGAL SEPARATION OF TWO-PHASE MIXTURES
7 Claims, 2 Drawing Figs.

[52] U.S. Cl. .................................................. 55/349, 55/419, 55/452, 55/459, 122/488
[51] Int. Cl. ........................................................ B01d 45/12
[50] Field of Search ............................................. 55/349, 419, 452, 459; 122/488

[56] References Cited
UNITED STATES PATENTS

| 373,374 | 11/1887 | Morse | 55/349 |
|---|---|---|---|
| 2,998,363 | 8/1961 | Blaser | 55/349 |
| 3,131,043 | 4/1964 | Burdock | 55/346 |
| 3,435,598 | 4/1969 | Coulter | 122/488 |

FOREIGN PATENTS

| 548,693 | 7/1956 | Belgium | 210/512 |
|---|---|---|---|
| 902,476 | 12/1944 | France | 55/349 |

OTHER REFERENCES
German Printed Application V 8136 dated 10- 56 Dr. Engler

*Primary Examiner*—Frank W. Lutter
*Assistant Examiner*—Bernard Nozick
*Attorneys*—Curt M. Avery, Arthur E. Wilfond, Herbert L. Lerner and Daniel J. Tick

ABSTRACT: A vessel, such as the horizontally extending collector in a forced-flow steam generator, communicates with drain pipes extending from the vessel bottom downwardly and with gas outlet lines extending upwardly from the top of the vessel. Tubular structures are mounted inside the vessel and have their interior communicate with respective supply conduits for the mixture to be supplied. The mixture supply conduit of each tubular structure enters in a tangential direction at about the middle of the structure. The ends of the structure are covered. The water separated by centrifugal action from the steam inside each tubular structure can drain through lateral slots in the bottom of the structure. The separated gas passes out of the ends of the structure through respective stub tubes.

APPARATUS FOR CENTRIFUGAL SEPARATION OF TWO-PHASE MIXTURES

This is a continuation of application Ser. No. 774,981, filed Nov. 12, 1968, now abandoned.

Our invention relates to a separation of liquid from gas and in a preferred, through not exclusive, aspect to the centrifugal separation of water from steam in the collector of a forced-flow once-through steam generator. The invention is related to those disclosed and claimed in the copending applications of G. Blank et al., Ser. No. 774,989, filed Nov. 12, 1968, claiming a German priority of Nov. 15, 1967; and K. Ruthrof et al., Ser. No. 774,999, filed Nov. 12, 1968, claiming a German priority of Nov. 21, 1967, these applications being assigned to the assignee of the present invention.

During starting-up or low-load operation of forced-flow or once-through steam generators there occurs a considerable amount of water immediately behind the evaporator heating surfaces, and it must be prevented that in this manner a plug of water will enter onto the superheater heating surfaces. For separating this temporarily occurring excess of water, it is generally customary to interpose into the circulation system a water-steam separator vessel immediately behind the evaporator heating surface. Such separator vessels are complicated and expensive.

It is an object of our invention, therefore, to secure a reliable elimination of the resulting water and hence a separation of the occurring water-steam mixture with the aid of simpler and less expensive means.

Another, more specific object of the invention is to effect a separation of the mixture and the elimination of the separated water directly in the outlet collectors of the evaporator heating surfaces.

There are known separating collectors which constitute a vertically elongated device which is equipped with inserts so that the entire collector operates as a centrifugal separating device. This, however, greatly increases the required overall volume of the separator so that no essential savings are achieved in comparison with the conventional separator vessels. It is therefore a further object of our invention to afford simply providing the conventional collectors with insert structures that effect a reliable separation and elimination without the necessity of adding extraneous equipment.

To achieve these objects, and in accordance with a feature of our invention, we provide an axially elongated separator vessel, preferably the collector vessel which follows the evaporator heating surface in a forced-flow boiler, with a number of insert structures so mounted in the vessel as to partition the interior into axially spaced separator chambers and intermediate gas chambers. We further provide supply conduit means for the mixture to be separated, this conduit means communicating from the outside of the vessel with the interior of the internal separator chambers in a substantially tangential direction so as to subject the entering mixture to centrifugal separating action. The insert structures are provided with gas outlets on axially opposite sides through which the separator chambers communicate with the gas chambers, and the insert structures are further provided with drain openings for the separated liquid which is discharged through conduit means communicating with these openings from the outside of the vessel, the separated gas being discharged by gas conduit means which communicate with the gas chambers.

According to another, preferred feature of our invention, we provide the collectors with laterally covered tubular structures of which each has a tangentially entering supply conduit for the steam-water mixture. The axial end faces of the tubular structures are traversed by coaxially arranged short tubes (stub tubes) which have a smaller diameter than the tubular structure and serve as outlets for the steam. The cylindrical jacket portion of the tubular structure is further provided in the vicinity of its axial ends with one or more openings for drainage of the separated water.

The steam-water mixture entering tangentially in the middle of the tubular body is first flung outwardly along the wall surface of the tubular body to travel on helical paths in the direction toward the respective end faces. This involves a reliable separation of the vaporous from the liquid phase. The vapor or steam passes through the stub tubes that are coaxially inserted into the ends or axial covers of the tubular structure, whereas the separated water will drain through the slots in the cylindrical jacket of the tubular structures.

Figure 2:
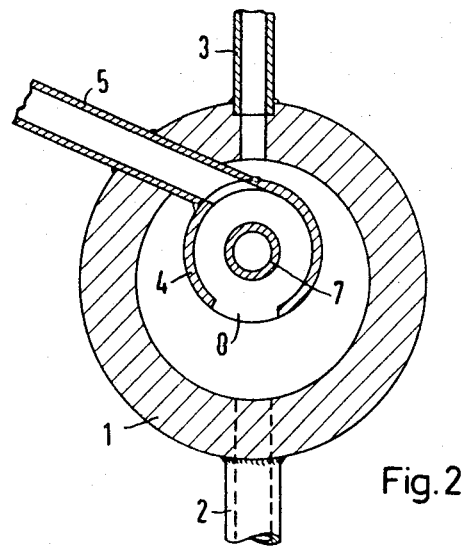

The invention will be further described with reference to an embodiment of the invention illustrated by way of example in the accompanying drawing, in which:

FIG. 1 shows schematically a longitudinal section of a separator vessel exemplified by a portion of a horizontally extending collector for a forced-flow steam generator; and FIG. 2 is a cross section taken along the lines II—II in FIG. 1.

The essentially cylindrical and horizontally extending collector vessel 1 in the illustrated embodiment is provided with a number of laterally covered tubular structures 4 whose respective axes extend parallel to the axis of the collector vessel and which are mounted in the top region of the vessel. Each of the tubular structures 4 communicates with a tangentially entering supply line 5 for the steam-water mixture. The end faces 6 of each tubular structure 4 are interrupted by coaxially arranged stub tubes 7 that protrude inwardly into the interior of the tubular structure 4. The tubular structures 4 are further provided with one or more openings 8 in their cylindrical jacket in the vicinity of the end faces 6. Preferably the openings 8 are located on the side facing away from the steam outlet lines 3 which communicate with the top portion of the collector vessel 1. The vessel further communicates with water outlet lines 2 which extend downwardly from the bottom portion of the vessel.

When the mixture of steam and water passes through the mixture supply conduits 5 tangentially into the middle of each tubular structure 4, the mixture is first flung onto the inner cylindrical surface in the direction toward the axial ends of the tubular structure, so that a reliable separation of water from steam takes place. The steam can escape through the stub tubes 7 and passes through the steam outlet lines 3 into the further heating surfaces, such as the superheater heating surfaces, or directly to the consuming equipment. The water passing through the openings 8 of the tubular structure 4 collects at the bottom of the collector vessel 1 from which it drains through the water outlet lines 2.

Since the mixture supply conduit 5 and the outlet slots 8 are axially spaced from each other, the entering mixture and the separated water are flung about in the tubular structure several times so that a good separation of the mixture is afforded. The mixture supply conduit 5 may enter at any desired locality into the collector vessel 1. That is, the conduit for the supply of mixture may also extend from below into the vessel 1 in a direction parallel to the water outlet lines 2. In this case, however, the water outlet slots 8 would be located beside the tangential mixture supply conduit 5 so that the draining water will pass downwardly into the collector and will not be entrained upwardly with the steam into the steam outlet lines 3.

It has been found sufficient in the use of such separators as water-steam separators in forced-flow boiler systems, to provide fewer water outlet lines 2 than steam outlet lines 3. The described water outlet lines 2 can then be passed back to any desired locality of the circulatory system in the same manner as in the water-steam separator devices heretofore customary.

By designing the described collectors according to the invention as centrifugal separators for eliminating water from the steam-water mixture, the resulting advantage of doing away with the heretofore necessary water-steam separators in the form of additional equipment applied behind the evaporator heating surfaces involves a considerable reduction in total cost. It is not necessary to increase the volume of the collectors proper. It rather suffices in many cases to employ collectors of the conventional or already installed type and to simply provide them additionally with the above-described tubular structures according to the invention.

However, the devices according to the invention are not only applicable for the centrifugal separation of steam-water mixtures behind the evaporator of steam boilers, but they are also applicable at any other locality at which it is necessary to separate water entrained in steam. Furthermore, the invention is generally applicable for the centrifugal separation of two-substance mixtures constituted by a gaseous and a liquid phase.

Upon a study of this disclosure it will be apparent to those skilled in the art that our invention permits of various other modifications and uses and consequently may be given embodiments other than particularly illustrated and described herein, without departing from the essential features of our invention and within the scope of the claims annexed hereto.

We claim:

1. Apparatus for centrifugal separation of two-phase mixtures into a liquid and a gaseous phase comprising a separator vessel having a horizontal longitudinal axis and being elongated along said axis, a tubular structure in said vessel in peripherally spaced relation thereto and having a horizontal longitudinal axis, said tubular structure being covered by respective end faces at its axial ends, a supply conduit for the mixture extending into said vessel and connecting with said tubular structure at the upper midregion thereof in a substantially tangential direction with respect to said tubular structure, whereby the mixture flowing through said conduit and entering said structure travels on helical paths in the direction toward said respective end faces to effect separation of the gaseous phase from the mixture, respective stub tubes of smaller diameter than said tubular structure disposed therein and mounted on said respective end faces and forming an outlet from within said tubular structure to the interior of said vessel for the gaseous phase separated from the mixture, said stub protruding inwardly into said tubular structure and forming respective annular spaces for accommodating the mixture traveling in helical paths, said tubular structure having respective openings in the bottom portion of said structure in its tubular wall in the region of said ends beneath said stub tubes and forming an outlet to the interior of said vessel for the liquid phase of said mixture, a plurality of gas outlets at the top region of said vessel for venting the gas phase from the interior of said vessel, and drain means at the bottom region of said vessel for draining the liquid phase from said vessel.

2. In apparatus according to claim 1, said tubular structure being disposed in said vessel such that said longitudinal axis of the former is parallel to said longitudinal axis of the latter.

3. In apparatus according to claim 1, said tubular structure being disposed in said vessel such that said longitudinal axis of the former lies above said longitudinal axis of the latter.

4. In apparatus according to claim 1, said respective stub tubes being disposed in substantially coaxial relation to said tubular structure.

5. In apparatus according to claim 1, said respective openings in the bottom portion of said tubular structure having a longitudinal width less than the length of said respective stub tubes.

6. An apparatus according to claim 1 wherein said vessel is a horizontally elongated collector of a forced-flow boiler, said drain means comprises water outlet lines extending downwardly from said collector, a plurality of said tubular structures being horizontally spaced from each other in said collector, each of said structures having said tangentially directed supply conduit extending laterally through and into said collector for supplying a steam-water mixture, and wherein said collector comprises steam lines connected to said gas outlets and extending upwardly from said collector.

7. In apparatus according to claim 6, for separating water from steam, said supply conduit communicating with said tubular structure at the top and in the middle thereof, and said water outlet openings being located in the bottom portion of said structure.

* * * * *